United States Patent
Totani et al.

(10) Patent No.: US 6,594,862 B2
(45) Date of Patent: Jul. 22, 2003

(54) GRIP, MOLDING METHOD AND MOLDING APPARATUS THEREFOR

(75) Inventors: Chiharu Totani, Nishikasugai-gun (JP); Takashi Hosokawa, Nishikasugai-gun (JP); Akiyoshi Nagano, Nishikasugai-gun (JP); Kazumichi Shigeno, Nishikasugai-gun (JP); Yoshiyuki Sakuma, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/935,632

(22) Filed: Aug. 24, 2001

(65) Prior Publication Data

US 2002/0024226 A1 Feb. 28, 2002

(30) Foreign Application Priority Data

Aug. 24, 2000 (JP) .................................... P. 2000-254458
Aug. 21, 2001 (JP) .................................... P. 2001-250713

(51) Int. Cl.$^7$ .............................. B62B 7/00; A45C 7/00; B60N 3/02
(52) U.S. Cl. .......................... 16/430; 16/438; 16/114.1; 16/DIG. 12; 16/DIG. 19
(58) Field of Search ................... 16/430, 438, 444, 16/445, 114.1, DIG. 12, DIG. 18, DIG. 19; 296/71, 214, 97.9; 224/268, 313; 74/543; 190/115, 116, 117

(56) References Cited

U.S. PATENT DOCUMENTS

| | | | | |
|---|---|---|---|---|
| 3,737,944 A | * | 6/1973 | Szabo et al. | 16/430 |
| 3,952,383 A | * | 4/1976 | Moore et al. | 24/265 R |
| 3,977,054 A | * | 8/1976 | Moore et al. | 24/265 R |
| 4,021,072 A | * | 5/1977 | Belanger | 296/71 |
| 4,226,464 A | * | 10/1980 | Janz et al. | 296/153 |
| 4,340,990 A | * | 7/1982 | Seynhaeve | 16/445 |
| 4,471,209 A | * | 9/1984 | Hollander | 219/204 |
| 5,440,783 A | * | 8/1995 | Allardyce et al. | 160/110.1 |
| 5,519,917 A | * | 5/1996 | Cordonnier | 16/422 |
| 5,931,525 A | * | 8/1999 | Rickabus | 296/214 |

FOREIGN PATENT DOCUMENTS

| | | | |
|---|---|---|---|
| JP | 5-042557 | | 2/1993 |
| JP | 8-258606 | | 10/1996 |
| JP | 10290726 A | * | 11/1998 |
| JP | 2000280808 | * | 10/2000 |
| JP | 2001138792 | * | 5/2001 |

\* cited by examiner

*Primary Examiner*—Chuck Y. Mah
(74) *Attorney, Agent, or Firm*—Posz & Bethards, PLC

(57) ABSTRACT

An attachment portion is formed of a synthetic resin material integrally with both ends of a grip body formed of a synthetic resin. A pair of concave portions opposed to each other are provided on an outer peripheral surface of a resin layer forming a hollow portion provided through gas injection in an almost central part in longitudinal direction of the grip body, thereby reducing a volume of the hollow portion and increasing a thickness of the resin layer to enhance a rigidity.

4 Claims, 6 Drawing Sheets

GRIP, MOLDING METHOD AND MOLDING APPARATUS THEREFOR

BACKGROUND OF THE INVENTION

1. Field of the Invention

The present invention relates to an assist grip to be gripped by a passenger getting on means of transportation such as a vehicle, a ship or an airplane to support the passenger's body, a grip to be gripped to delivery a trunk case or an attaché case, a molding method and molding apparatus of the grip.

The present application is based on Japanese Patent Applications No. 2000-254428 and No. 2001-250713, which are incorporated herein by reference.

2. Description of the Related Art

In general, an assist grip is attached to the left side edge of a ceiling portion of a passenger seat in an automobile for right hand steering in order to maintain safety for a passenger. The assist grip is formed by a lateral elliptic cylindrical grip body molded by a synthetic resin material and an attachment portion molded integrally with both ends by a synthetic resin material. In order to give a soft feeling when gripping the grip body, a leather is bonded to an outer periphery thereof or an outer coating layer is molded by a soft synthetic resin material over the outer periphery of the grip body.

In order to reduce a weight and to prevent a shrinkage cavity from being formed after resin molding, 5 a gas injection molding method has been employed for the assist grip. In the grip molded by the method, a gas injection port 41a is formed in the central part of an elliptic cylindrical grip body 41 and a large hollow portion 41b is formed on the grip body 41 corresponding to the gas injection port 41a as shown in a cross section of FIG. 12 so that the thickness of a resin layer 41c is reduced.

In the conventional grip, the thickness of the resin layer 41c provided in the vicinity of the gas injection port 41a in the grip body 41 is reduced so that a rigidity is deteriorated. Therefore, in the case in which a passenger grips and excessively pulls the grip body 41, there is a possibility that a failure might be caused by stress concentration.

Moreover, in the case in which a soft synthetic resin material is injected and molded over the outer periphery of the grip body 41 to mold an outer coating layer 42 as shown in a chain line of FIG. 12, the rigidity 2 of the grip body 41 is deteriorated as described above so that the gripbody41 is easily deformed by an injection pressure and heat during molding. For this reason, it is necessary to set the range of soft material molding conditions to be reduced and there is also a problem in that productivity cannot be enhanced.

SUMMARY OF THE INVENTION

It is an object of the invention to provide a grip capable of solving the problems of the conventional art to enhance a rigidity and capable of enhancing productivity in the case in which an outer coating layer formed of a soft synthetic resin material is to be molded on the outer peripheral surface of a grip body.

It is another object of the invention to provide a method of molding a grip and a molding apparatus which can easily manufacture the grip.

In order to solve the problems described above, a first aspect of the invention is directed to a grip comprising a grip body provided with a resin layer covering a hollow portion formed inside the grip body by gas injection, and a pair of attachment portions formed integrally with both ends of the grip body, wherein a reinforcement portion is formed substantially in a central part in longitudinal direction of the grip body.

A second aspect of the invention is directed to the grip according to the first aspect, wherein the reinforcement portion comprises a pair of concave portions provided on an outer peripheral surface of the resin layer so as to be opposed to each other, a pair of raised portions formed by the concave portions and a thick portion formed on the resin layer having a larger thickness than other portions in the resin layer, thereby reducing a volume of the hollow portions.

A third aspect of the invention is directed to the grip according to the second aspect, wherein the hollow portion is constituted by a first hollow portion formed in a gas injection port side of the hollow portion and bounded with the raised portions and a second hollow portion formed in the opposite side of the hollow portion to the gas injection port, and a spacing W between inner bottom surfaces of the concave portions is set such that a volume of the first hollow portion is substantially larger than a volume of the second hollow portion.

A fourth aspect of the invention is directed to the grip according to the second aspect, wherein a spacing W between inner bottom surfaces of the concave portions is set such that the hollow portion is formed on only the gas injection port side with the raised portions to be a boundary.

A fifth aspect of the invention is directed to the grip according to the second aspect, wherein the concave portions are flat and are formed to have a predetermined length in a longitudinal direction of the grip body.

A fifth aspect of the invention is directed to a method of molding a grip comprising the steps of forming a cavity for a grip body by a mold; providing a resin injection gate and a gas injection gate on a surface of the cavity in a substantially central part of a longitudinal direction of the grip body, the resin injection gate and the gas injection gate being provided at substantially the same position, protruding a plurality of cores into the cavity for molding at least one pair of concave portions, the cores being provided on a position corresponding to the resin injection gate and the gas injection gate; injecting a molten resin into the cavity through the resin injection gate; and injecting a gas into an internal of the molten resin through the gas injection gate, thereby forming hollow portion, raised portions and a thick portion.

A seventh aspect of the invention is directed to a molding device for a grip comprising a mold for forming a cavity; a resin injection gate provided on an inner surface of the mold; a gas injection gate and a resin injection gate provided on the inner surface of the mold 110 and substantially in a central part in a longitudinal direction of the cavity, the gas injection gate and the resin injection gate being provided substantially on the same position; and a plurality of cores for forming at least one pair of concave portions on a grip body, the cores being provided on positions corresponding to the gas injection gate and the resin injection gate.

DETAILED DESCRIPTION OF THE PREFERRED EMBODIMENTS

An embodiment of a grip, a method of molding the same and a molding apparatus which carries out the invention will be described below with reference to FIGS. 1 to 9.

The structure of an assist grip 11 will be described with reference to FIGS. 1 to 3. The assist grip 11 is integrally molded by a synthetic resin material such as polypropylene or polyethylene. The assist grip 11 comprises an elliptic cylindrical grip body 12 and attachment portions 13 and 14 formed integrally with both ends respectively. Fixtures 15 and 16 are connected to the attachment portions 13 and 14 through a hinge mechanism which is not shown, thereby attaching the assist grip 11 to a frame in an automobile which is not shown.

Figure 1:
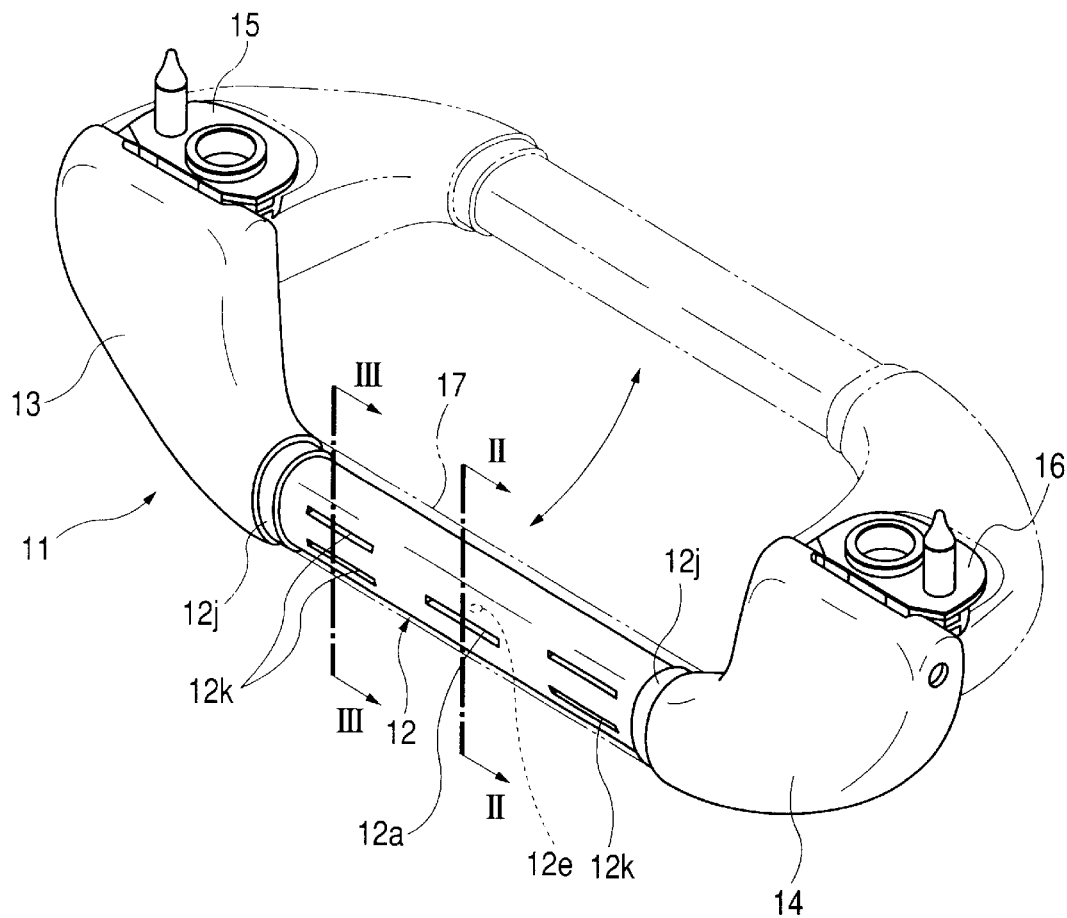
FIG. 1 is a perspective view showing an embodiment in which the invention is embodied in an assist grip for an automobile.

When the grip body 12 is gripped and pulled downward in a nonuse condition shown in a chain line of FIG. 1, a use condition is set as shown in a solid line of FIG. 1. Moreover, when the grip body 12 is unhanded, it automatically returns to a nonuse position shown in the chain line from a use position shown in the solid line.

Figure 2:
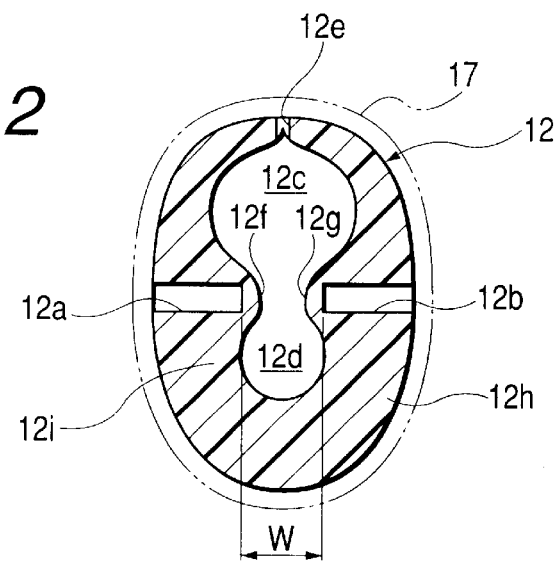
FIG. 2 is a cross-sectional view taken on line II—II in FIG. 1, showing a central part of a grip body.

FIG. 2 is a cross-sectional view showing the central part in longitudinal direction of the grip body 12 illustrated in FIG. 1, which is taken on line II—II in FIG. 1 and inverted vertically. A first concave portion 12a and a second concave portion 12b are formed on right and left sides in the central part of the grip body 12, and hollow portions 12c and 12d are formed between the concave portions 12a and 12b. A gas injection port 12e is formed to inject a gas during molding above a resin layer 12h. A first raised portion 12f and a second raised portion 12g are formed on opposed portions of the first concave portion 12a and the second concave portion 12b. A thick portion 12i having a larger thickness in the resin layer 12h is formed under the first and second concave portions 12a and 12b.

In this embodiment, a reinforcement portion is formed by the first and second raised portions 12f and 12g and the thick portion 12i.

Moreover, as shown in FIG. 1, a step portion 12j is formed on both ends of the grip body 12 respectively. A plurality of grooves 12k are formed close to the step portion 12j over the outer peripheral surface of the grip body 12.

Figure 3:
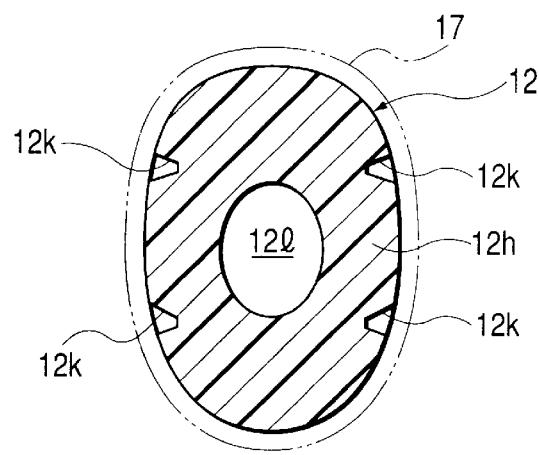
FIG. 3 is a cross-sectional view taken on line III—III in FIG. 1, showing an end of the grip body.
Figure 7:
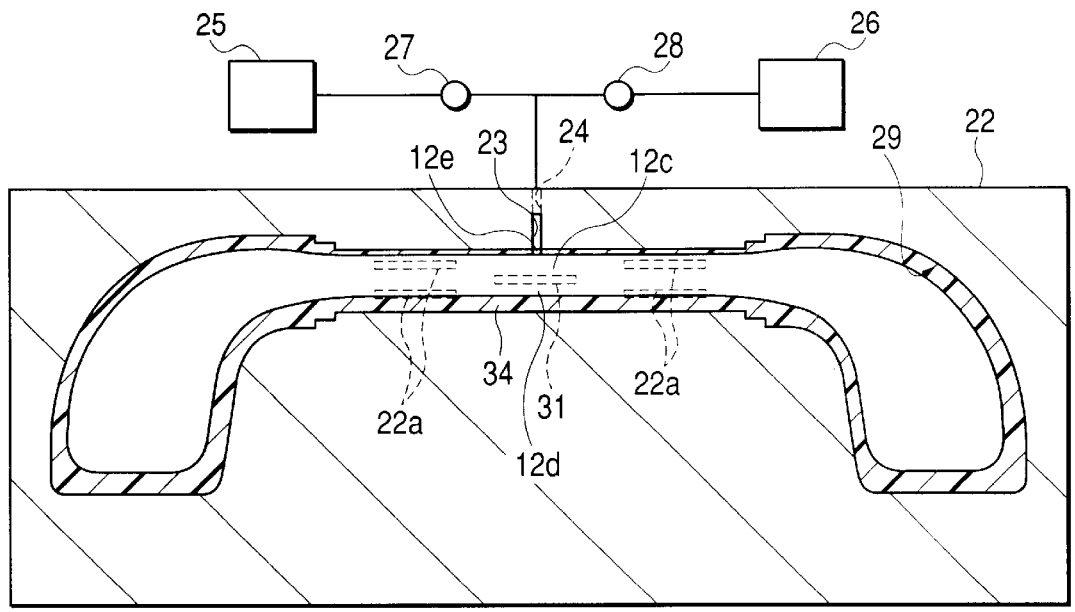
FIG. 7 is a longitudinal sectional view showing the molding apparatus at completion of molding.

FIG. 3 is a cross-sectional view taken on line III—III in FIG. 1, showing the grip body 12 passing through the groove 12k. As is apparent from FIG. 3, a hollow portion 121 is formed through gas injection in the central part of the resin layer 12h. As shown in FIG. 7, the hollow portion 121 communicates with the hollow portions 12c and 12d and also communicates with hollow portions formed in the attachment portions 13 and 14.

An outer coating layer 17 formed of a leather is bonded to the outer peripheral surface of the grip body 12 in order to give a soft feeling to the grip body 12. The outer coating layer 17 may be formed integrally by bonding a sheet formed of a soft synthetic resin material at a subsequent step or through molding by using the soft synthetic resin material.

Next, a molding apparatus for molding the assist grip 11 will be described with reference to FIGS. 4 and 5.

A first mold 21 and a second mold 22 are combined separably in a transverse direction. A resin injection gate 23 is provided in the upper matching portion of the molds 21 and 22 to correspond to the central part of the assist grip 11, and a gas injection gate 24 is provided in the vicinity of the resin injection gate 23. The resin injection gate 23 is connected to a feeding device 25 for a molten resin, and the gas injection gate 24 is connected to a feeding device 26 for a gas. The reference numerals 27 and 28 denote feeding control valves for the molten resin and the gas, respectively.

A cavity 29 formed by the first mold 21 and the second mold 22 is formed to have such a shape that the assist grip 11 shown in the solid line of FIG. 1 is inverted vertically.

Slide cores 30 and 31 are supported on the first mold 21 and the second mold 22 to proceed into the cavity 29 corresponding to the gates 23 and 24, and can be switched from an operation position to a retreat position through position switching mechanisms 32 and 33 such as a cylinder.

Figure 4:
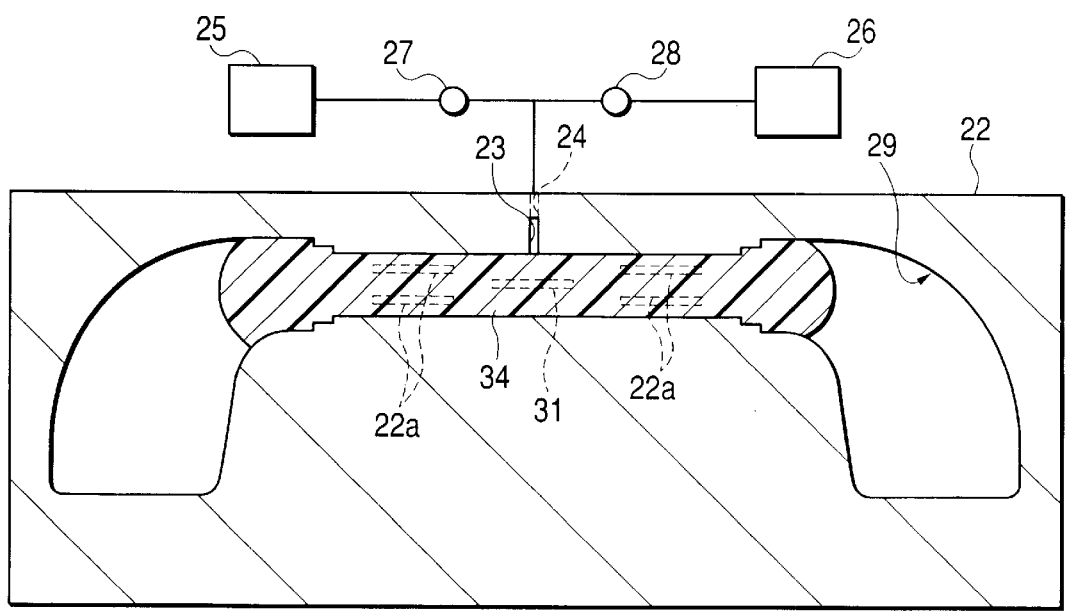
FIG. 4 is a longitudinal sectional view showing a molding apparatus in the middle of molding.
Figure 9:
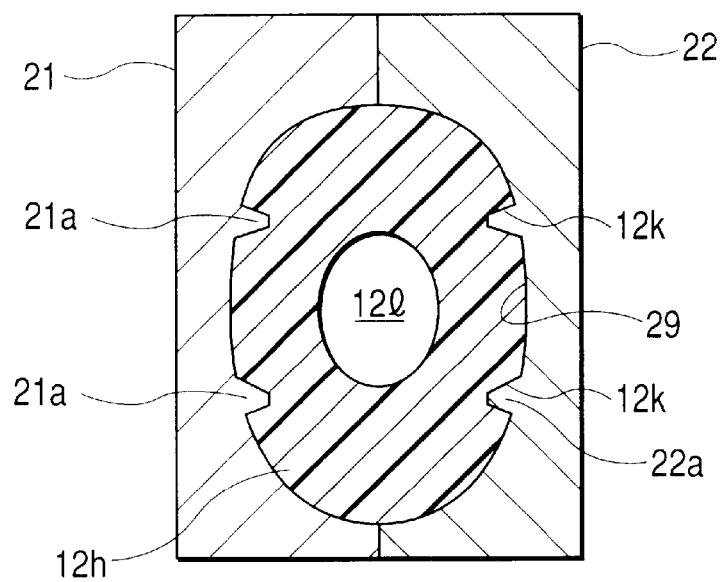
FIG. 9 is a cross-sectional view showing the method of molding a grip.

As shown in FIGS. 4 and 9, a molding projections 21a and 22a for molding the groove 12k are integrally formed on the first and second molds 21 and 22.

In FIG. 4, at the both ends in the longitudinal direction of the cavity 29, there are provided air-bleeding passages having a magnetic valve (not shown), respectively.

Next, the method of molding the assist grip 11 by using the molding apparatus will be described with reference to FIGS. 4 to 9.

Figure 5:
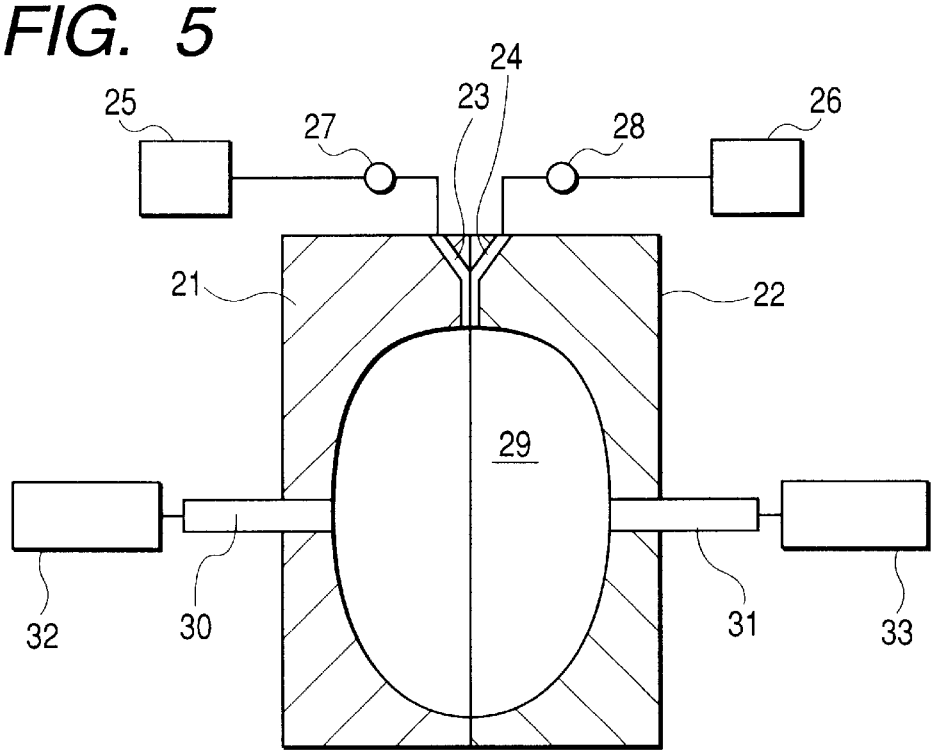
FIG. 5 is a cross-sectional view showing the molding apparatus.

First of all, as shown in FIG. 5, the first mold 21 and the second mold 22 are matched to stop the slide cores 30 and 31 at a retreat position, and furthermore, to stop the feeding control valve 28 and to operate the feeding control valve 27, thereby injecting a molten resin 34 to be a hard synthetic resin such as a polypropylene resin or a polyethylene resin from the resin injection gate 23 to the cavity 29. As shown in FIG. 4, the amount of the molten resin 34 to be fed is set to be smaller than the volume of the cavity 29.

Figure 6:
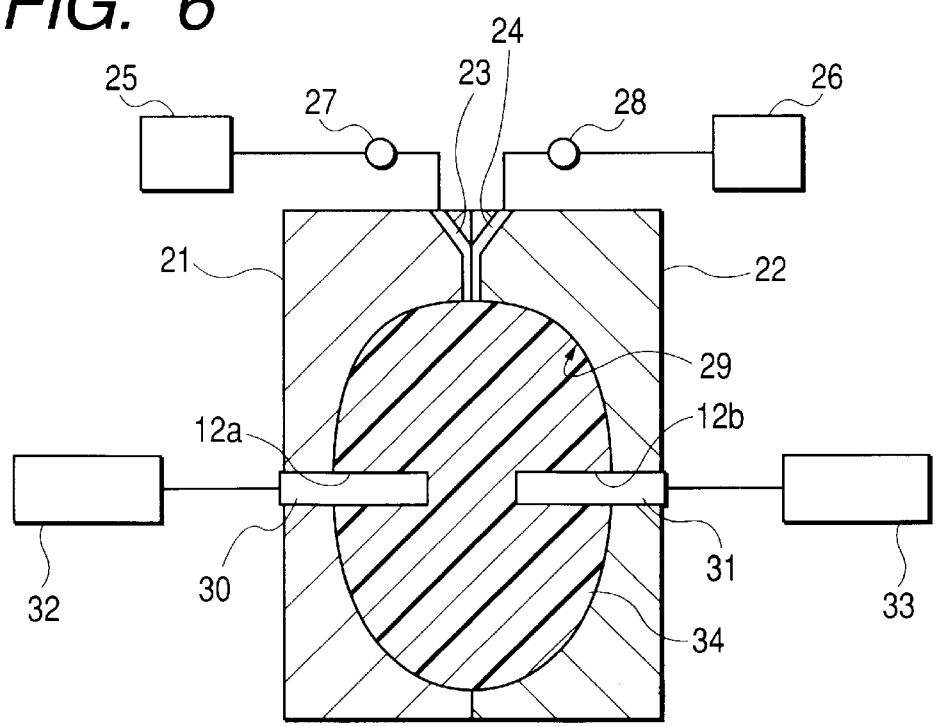
FIG. 6 is a cross-sectional view showing a method of molding a grip.

Next, the position switching mechanisms 32 and 33 are operated to move the slide cores 30 and 31 from a retreat position shown in FIG. 5 to an operation position shown in FIG. 6, thereby forming the first concave portion 12a and the second concave portion 12b in the molten resin 34.

Figure 8:
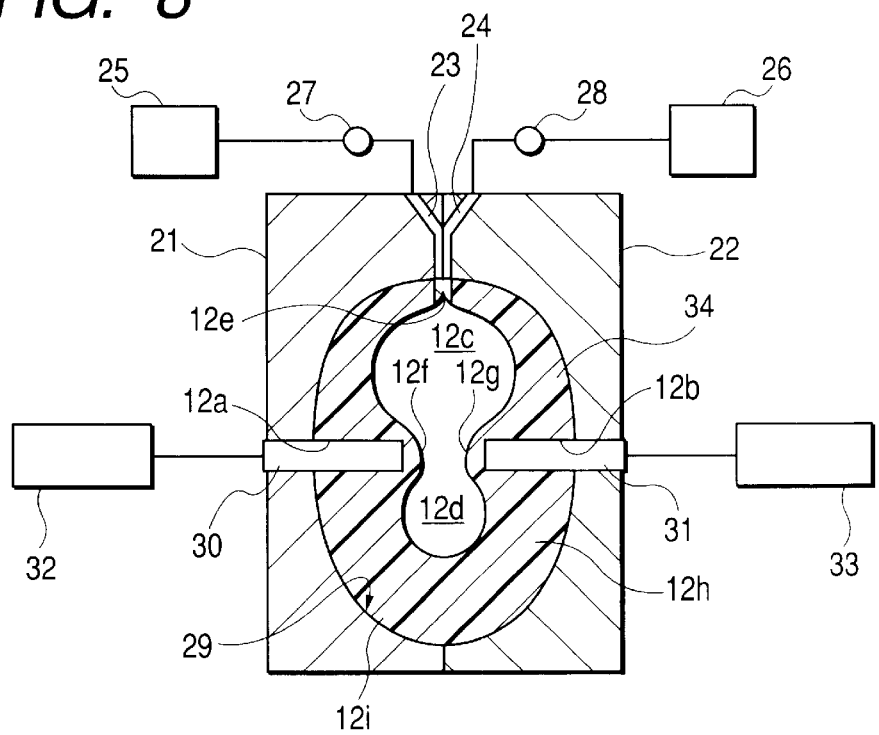
FIG. 8 is a cross-sectional view showing the method of molding a grip.

As shown in FIG. 7, furthermore, a gas is injected from the gas injection gate 24 into internal of the molten resin 34 and the molten resin 34 is inflated and pressed toward the cavity 29 side for molding the attachment portions 13 and 14. The air provided within the cavity 29 is discharged through the unillustrated air-bleeding passages. In this process, as shown in FIG. 8, the hollow portions 12c and 12d are formed in the molten resin 34 corresponding to the slide cores 30 and 31. At this time, the gas is hard to proceed downward from the slide cores 30 and 31. Therefore, the volume of the hollow portion 12c formed above both of the slide cores 30 and 31 is increased and the volume of the hollow portion 12d formed therebelow is reduced. FIG. 9 shows a cross section of the cavity 29 for forming the groove 12k, and the hollow portion 12l communicating with the hollow portions 12c and 12d is formed.

After a predetermined time passes and the molten resin 34 is cured, the slide cores 30 and 31 are moved to the retreat position to separate the first mold 21 from the second mold 22, thereby taking out the assist grip 11. Then, a leather or a soft synthetic resin sheet is wound onto the outer peripheral surface of the grip body 12 and is bonded with an adhesive to form the outer coating layer 17. Thus, the manufacture of the assist grip 11 is completed. The soft synthetic resin layer may be injected and molded over the outer peripheral surface of the grip body 12 at a subsequent step, thereby forming the outer coating layer 17.

According to the grip, the method of molding the grip and the molding apparatus in accordance with the embodiment, the following features can be obtained.

(1) In the embodiment, the first concave portion 12a and the second concave portion 12b are formed in the central part in the longitudinal direction of the grip body 12 of the assist grip 11, the volumes of the hollow portions 12c and 12d are reduced and the thick portion 12i having a larger thickness in the resin layer 12h is formed corresponding to the reduction in the volumes. The reinforcement portion is formed by the first raised portion 12f, the second raised portion 12g and the thick portion 12i on a position corresponding to the gas injection port 12e of the grip body 12. Consequently, a rigidity can be increased in the central part in the longitudinal direction of the grip body 12 where the gas injection port 12e is formed and it is possible to prevent a failure of the grip body from being caused by external force.

Moreover, when the outer coating layer 17 is to be injected and molded over the outer periphery of the grip body 12 through the soft synthetic resin material, the grip body 12 is deformed with difficulty by an injection pressure and heat during molding because the grip body 12 has a high rigidity. Consequently, the range of the soft material molding conditions can be set to be wider and productivity can be enhanced.

(2) In the embodiment, the slide cores 30 and 31 are provided on the first mold 21 and the second mold 22 to form the first and second concave portions 12a and 12b and the first and second raised portions 12f and 12g. Consequently, the sizes of the reinforcement portion provided with the first concave portion 12a, the second concave portion 12b and the thick portion 12i can be regulated easily.

(3) A spacing W between the inner bottom surfaces of the concave portions 12a and 12b is set such that the volume of the hollow portion 12c on the gas injection port 12e side is increased and that of the hollow portion 12d on the opposite side of the gas injection port 12e is reduced with both concave portions 12a and 12b to be a boundary during molding as shown in FIG. 2. Consequently, it is possible to enhance the rigidity by increasing the thickness of the resin layer 12h by forming the thick portion 12i on the hollow portion 12d side on which the force of fingers act most greatly in the use condition of the grip body 12.

(4) Both of the concave portions 12a and 12b are flat and are formed opposite to each other to have a predetermined length in the longitudinal direction of the grip body 12. Therefore, the molding can easily be carried out by using a fixed core or a slide core.

The embodiment may be changed in the following manner.

Figure 10:
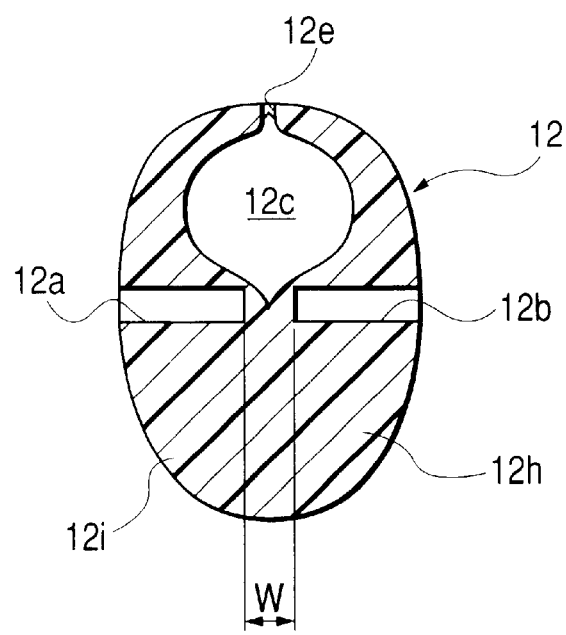
FIG. 10 is a cross-sectional view showing another example of the grip according to the invention.

As shown in FIG. 10, a protrusion of each of the slide cores 30 and 31 to the cavity 29 may be more lengthened than that in the embodiment, thereby forming the hollow portion 12c only above both slide cores 30 and 31.

In another example, the hollow portion 12c is formed on only the gas injection port 12e side by setting both concave portions 12a and 12b to be a boundary and the opposite side of the gas injection port 12e wholly acts as the thick portion 12i. Thus, the rigidity can further be enhanced.

Figure 11:
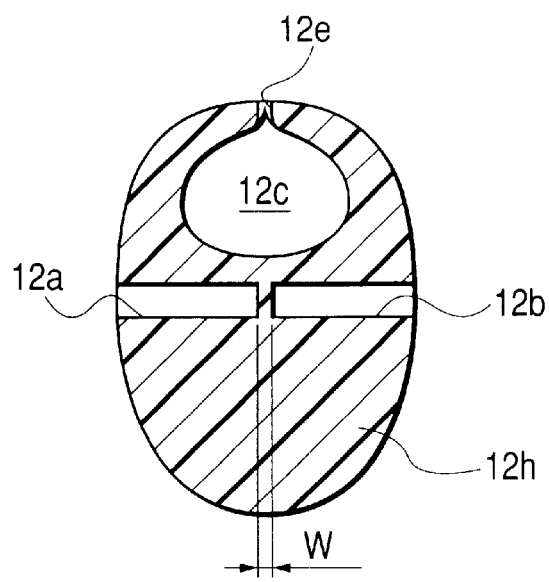
FIG. 11 is a cross-sectional view showing a further example of the grip according to the invention.
Figure 12:
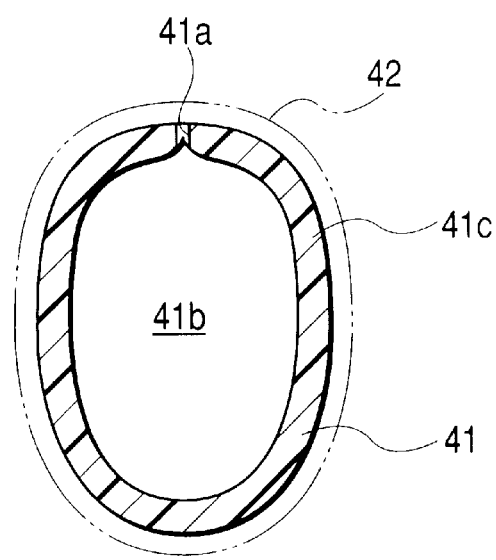
FIG. 12 is a cross-sectional view showing a conventional grip.

As shown in FIG. 11, the slide cores 30 and 31 may be caused to approach each other or to come in contact with each other, thereby forming the hollow portion 12c to have a closed annular shape above both slide cores 30 and 31.

The concave portion may be formed in three places, or four places or more in total, which is not shown.

For example, the invention may be embodied in an assist grip to be gripped by a passenger getting on means of transportation such as a vehicle, a ship or an airplane to support the passenger's body or a grip to be gripped for delivering a trunk case or an attaché case.

As described above in detail, according to the first to fourth aspects of the invention, the rigidity can be increased, and productivity can be enhanced when the outer coating layer is to be formed of a soft synthetic resin material.

According to the method of molding a grip and the molding apparatus in accordance with the fifth and sixth aspects of the invention, the grip can easily be manufactured.

What is claimed is:

1. A grip comprising:
   a grip body, which is generally longitudinal and has two opposed ends, wherein the grip body is formed by a resin layer that covers a hollow space, the hollow space being formed by gas injection, wherein the grip body includes a reinforcement portion formed substantially in a longitudinally central location of the grip body, and the reinforcement portion includes:
      a pair of concave portions located on the outer surface of the resin layer, wherein the concave portions are opposed to one another;
      a pair of raised portions formed by the concave portions, the raised portions being opposed to one another; and
      a thickened section of the resin layer, wherein the thickness of the thickened section is generally greater than that of other parts of the resin layer; and
   a pair of attachment portions, which are formed integrally with the ends of the grip body, respectively.

2. The grip according to claim 1, wherein:
   the reinforcement portion includes a gas port, for permitting the entry of gas during manufacturing to form the hollow space;
   the hollow space includes a first hollow portion, which is located on the same side of the grip as the gas port, and a second hollow portion, which is formed on a side of the grip that is opposite to the gas port, and the raised portions are located between the first and second hollow portions; and
   a distance between innermost surfaces of the concave portions is set such that the volume of the first hollow portion is substantially larger than the volume of the second hollow portion.

3. A grip according to claim 1, wherein:
the reinforcement portion includes a gas port, for permitting the entry of gas during manufacturing to form the hollow space;
a distance between innermost surfaces of the concave portions is set such that the hollow space is formed on only a side of the reinforcement portion at which the gas port is located, and the raised portions form a boundary of the hollow space.

4. A grip according to claim 1, wherein the concave portions have flat surfaces and have a predetermined dimension in the longitudinal direction of the grip body.

* * * * *